Patented June 6, 1944

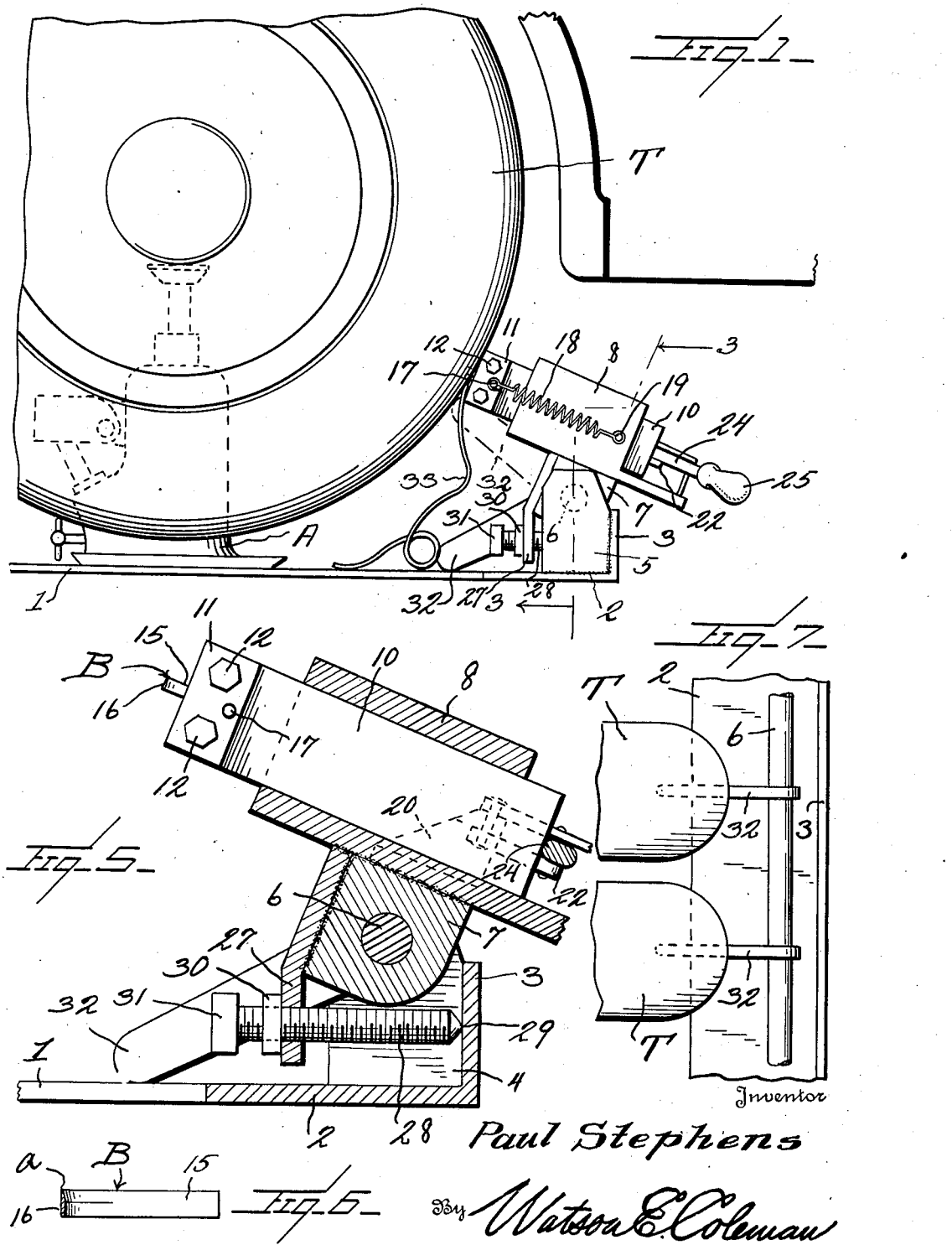

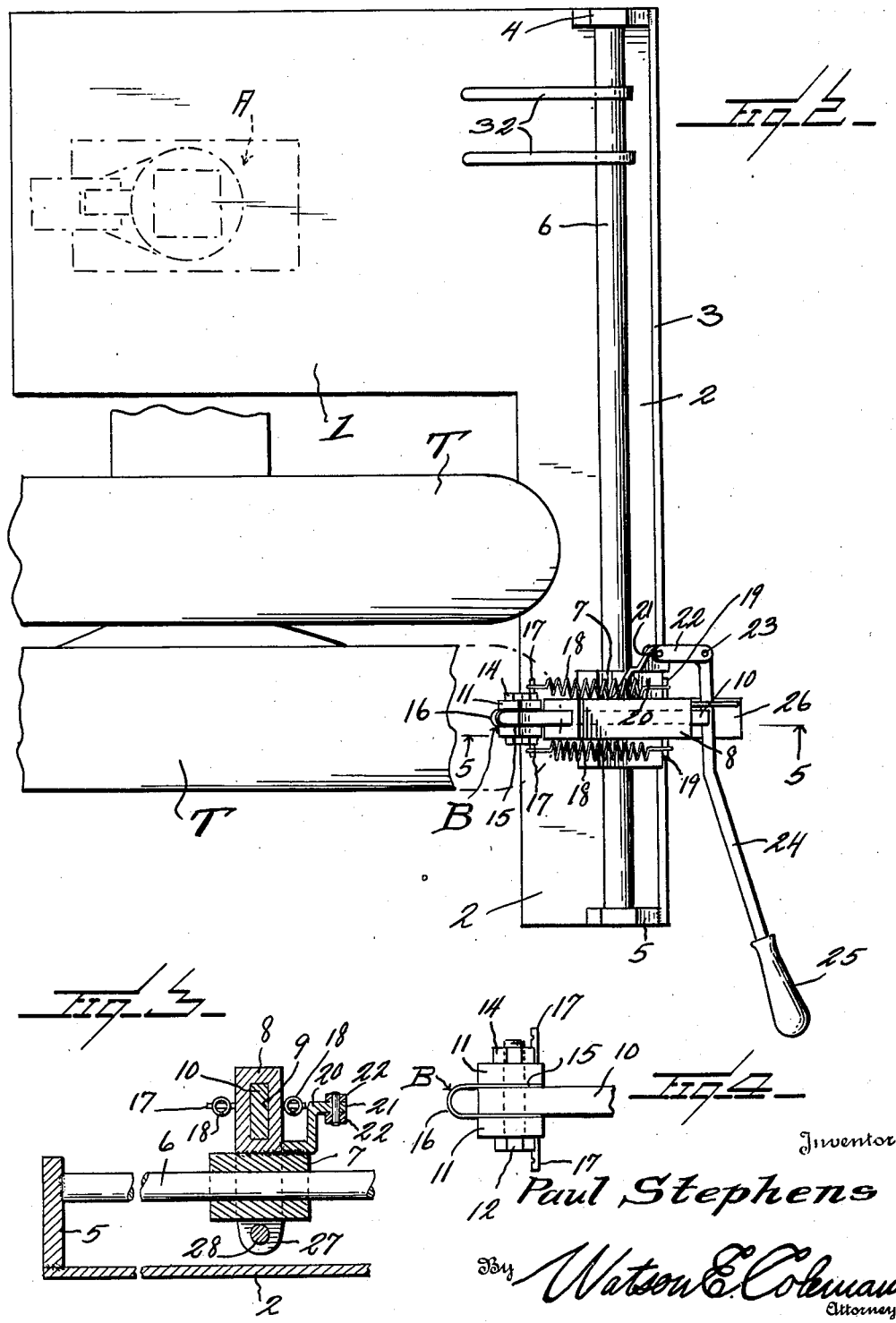

2,350,375

UNITED STATES PATENT OFFICE 2,350,375

TIRE REGROOVING DEVICE

Paul Stephens, Nacogdoches, Tex., assignor of twenty-five per cent to Lillard L. Brantley, Nacogdoches, Tex.

Application January 22, 1942, Serial No. 427,835

3 Claims. (Cl. 82—4)

This invention relates to a tire regrooving device, and it is a particular object of the invention to provide a device of this kind of a portable type and also of a type whereby the device is effectively held in working position with respect to a tire being grooved by the weight of the vehicle.

It is also an object of the invention to provide a device of this kind which is constructed in a manner to allow the same to be readily used in connection with any type of vehicle, and wherein is comprised a cutter assembly which can be easily changed as the requirements of practice may necessitate.

An additional object of the invention is to provide a device of this kind for regrooving the tires of a wheel of a truck or kindred motor driven vehicle wherein the device is so constructed as to be placed in effective position with respect to a tire to be regrooved, and wherein the grooving operation is effected by the rotation of the wheel by the motor of the vehicle.

The invention also has for an object to provide a device or machine for regrooving tires of a type to cut only straight grooves.

The invention consists in the details of construction and in the combination and arrangement of the several parts of my improved regrooving device whereby certain important advantages are attained, as will be hereinafter more fully set forth.

In order that my invention may be the better understood, I will now proceed to describe the same with reference to the accompanying drawings, wherein:

Figure 1 is a fragmentary view, in side elevation, illustrating a tire regrooving device or machine in applied or working position;

Figure 2 is a view in top plan of the device or machine as herein comprised, a lifting jack being indicated by broken lines and dual wheels of a vehicle being fragmentarily illustrated;

Figure 3 is a fragmentary detailed sectional view taken substantially on the line 3—3 of Figure 1;

Figure 4 is an enlarged fragmentary view in top plan of a cutter assembly as herein comprised;

Figure 5 is an enlarged fragmentary vertical sectional view taken substantially on the line 5—5 of Figure 2, looking in the direction of the arrows;

Figure 6 is a fragmentary view of the cutting or grooving knife unapplied; and

Figure 7 is a fragmentary view in top plan showing the gauge or setting arms in working position with respect to dual tires.

As illustrated in the accompanying drawings, 1 denotes a flat plate of desired dimensions and which constitutes a seat or base upon which is to be placed the jack A for lifting from the ground surface the tires T of the dual wheels to be regrooved. The jack A may be of any desired type preferred and, of course, engages the vehicle in a customary manner. While I particularly refer to the dual tires T, it is believed to be obvious that my improved regrooving device or machine can be employed to advantage with a single tire, or with tires in a group of any desired number. One end portion of the plate 1 is provided with a laterally disposed elongated flat arm 2 of desired dimensions and which is coplanar with the plate 1. This plate 1 and arm 2 are adapted to be placed upon the roadway or other surface with the plate 1 at the inner side of the wheels so that the jack A may be readily placed upon the plate 1 and properly engaged with the vehicle to lift the vehicle a distance sufficient to raise the tires T free of the roadway or other surface. By this arrangement it is to be pointed out that the load carried by the jack A serves to effectively hold the device or machine in desired working position.

As is clearly illustrated in the accompanying drawings, the arm 2 extends to the opposite sides of the wheels carrying the tires T but in close proximity to the lower tread portions of the tire, as is particularly illustrated in Figure 1 of the drawings. At this time it is to be stated that the device or machine as herein disclosed is primarily intended to be used in regrooving the tires carried by the rear or driven wheels of a truck or other motor driven vehicle, as it is not the practice to employ in connection with the front wheels of such vehicles, and more particularly trucks and buses, tires which may be unduly worn.

The forward margins of the plate 1 and arm 2 are defined by the upstanding flange 3 and the plate 1, at one end of said flange 3, has welded or otherwise secured thereto an upstanding post or support 4 which is also welded or otherwise securely anchored to the flange 3. The outer end portion of the arm 2 also has welded thereto an upstanding post or support 5 which is also welded or rigidly secured to the adjacent end portion of the flange 3. These posts or supports 4 and 5 each extend above the flange 3, and fixedly secured to the upper portions of these posts or supports 4 and 5 are the extremities of a rod 6.

Slidably mounted on the rod 6 and also free to rotate therearound is a sleeve or bushing 7, Welded or otherwise secured to the upper portion of this bushing or sleeve 7, at substantially its longitudinal center, is an elongated housing or box 8 open at both ends and having its bore 9 angular in cross section. This housing or box 8 has its longitudinal axis disposed at right angles to the rod 6.

Freely but snugly insertible through the housing or box 8 is a cutter bar 10, said bar being of a length materially longer than the length of the housing or box 8. The bar 10 is provided with flat side faces, and overlying the forward end portions of said side faces are the clamping plates 11 held to the bar 10 by the removable bolts 12 with which are associated the conventional nuts 14. The plates 11 serve to hold in place the regrooving knife B. This knife is substantially in the form of an elongated U with the side arms 15 substantially in parallelism. This knife B, as is clearly illustrated in Figure 4, bridges the outer end portion of the bar 10, with the intermediate curved portion 16 a desired distance in advance of the adjacent end of the bar 10. This curved portion 16 has a margin thereof formed to provide a sharp cutting edge *a* (Figure 6). Each of the plates 11, at its rear central part, is provided with an outstanding pin 17 to which is adapted to be detachably connected an end portion of a retractile member 18 herein disclosed as a coil spring of desired tension. The opposite end portion of this spring is detachably connected to an outstanding pin 19 carried by the rear portion of the housing or box 8.

The springs 18 serve to retract the bar 10 and maintain the same at the limit of its inward movement as determined by the contact of the rear edges of the plates 11 with the forward end of the housing or box 8. The sleeve or bushing 7 has fixed to one end portion thereof and to the one side of the housing or box 8 an upstanding bracket 20, to the outer or free end portion of which is pivotally connected, as at 21, the rigid links 22. These links 22 are above and below the adjacent end portion of the bracket 20 and the outer or opposite end portions of these links 22 receive therebetween and are pivotally connected, as at 23, to an end portion of an elongated lever or pressure member 24. This lever or member 24 is disposed toward the outer end of the arm 2 and extends across the rear end of the bar 10. This lever or member 24 has its outer portion, or that portion outwardly of the housing or box 8, inclined in a direction away from the housing or box and is provided at its outer end portion with a suitable hand grasp 25. This formation of the lever or member 24 is to facilitate its desired manipulation irrespective of the position of the cutter assembly upon the rod 6. The rear end of the housing or box 8 is provided at its bottom with a flat extension 26 to support the lever or member 24 and to assure the same being maintained in proper position for contact with the bar 10 during a working operation.

Depending from the sleeve or bushing 7, below the housing or box 8, is a rigid arm 27 through which threads an elongated shank 28. The inner end of this shank 28, in the present embodiment of my invention, is pointed, as at 29, and such pointed end has direct contact with the flange 3 so that upon requisite turning of the shank 28 the housing or box 8 may be swung around the rod 6 within certain limits to selectively vary the angle of the housing or box 8, or more particularly the bar 10 carried thereby. Threaded on the shank 28 outwardly of the arm 27 for coaction with said arm is a lock nut 30 whereby the shank 28 is effectively locked in its endwise adjustment through the arm 27. The outer end of the shank 28, as herein disclosed, carries a head 31 to facilitate rotation of the shank in adjusting the same as required.

In employing the device or machine in connection with the tires of dual wheels it is of advantage to initially place the device or machine in such position with respect to the treads or peripheries of the tires to have the device so placed that after completing the regrooving of one tire the cutter assembly can be readily shifted into position for regrooving the next tire without requiring any replacing of the device or machine as a whole. Provision of means such as this has been found of advantage in view of the fact that it often occurs that in dual wheels the tire of one wheel will wear down more than the tire of a second wheel and by initially placing the device or machine with the rod 6 substantially parallel to the high points of the peripheries or treads of the dual wheels, the cutter assembly can be readily shifted from one tire to the other. To facilitate this initial placing of the device or machine, the elongated gauge arms 32 are provided. These arms are freely engaged at one end with the rod 6 for movement lengthwise of the rod and also for swinging movement with respect thereto. These arms 32 also have their outer ends in a plane substantially parallel to the rod 6.

In practice, the device or machine is placed upon the roadway or other surface in advance of the driving or rear wheels of a vehicle at one side thereof with the plate 1 inwardly of said wheels. The arms 32 are then shifted along the rod 6 to position said rods at the high points or centers of the peripheries or treads of the tires T with the outer or free ends of the arms 32 in close contact with said high points or tires T, indicated by broken lines in Figure 1 of the drawings, and as also further illustrated in Figure 7 of the drawings. After this placing of the device or machine has been gauged through the medium of the arms 32, said arms 32 are then shifted back out of the way, as illustrated in Figure 1 of the drawings. The cutter assembly is then shifted along the rod 6 into desired position with respect to the tire T to be regrooved and after being properly set is locked in such position through the medium of the shank 28. The wheel carrying the tire to be regrooved is then caused to rotate at low speed by the motor of the vehicle. The operator then swings the lever or pressure member 24 to bring the cutting knife B into proper engagement with the tire T to assure the desired regrooving of the tire as the tire rotates. The tire, during this working operation, preferably rotates forwardly and downwardly toward the cutter assembly, as is indicated by the string or strip 33 (Fig. 1) cut out during the regrooving operation. After one of the tires has been regrooved it is only necessary to shift the cutter assembly along the rod 6 for proper engagement with the second tire. It is again to be stated that after the device or machine has been placed in desired position as determined by the gauge arm 32, the jack A is placed upon the plate 1 and brought into desired engagement with the vehicle to raise the same sufficiently to free the tires of the dual wheels from the roadway or other surface. By this it is to be again pointed out that the weight of the vehicle through the jack A upon the plate 1 serves to effectively hold the device or machine in position.

While the device or machine as herein disclosed is shown as being positioned in advance of the tires, it is to be understood that if preferred it can be employed with equal facility at the rear of the tires, but in which case the wheels will be reversely driven. It is also to be stated that each device or machine should preferably include in its distribution at least three different cutter bars, one for a shallow groove, one for a medium groove, and one for a deep groove, each of said cutter bars carrying, of course, a cutter knife B as required. It is believed to be clearly apparent that a cutter bar 10 can be readily removed or applied as the bar is detachably held to the housing or box 8 by the retractile members or springs 18 which can be readily engaged with or disengaged from the pins 17 or 19.

From the foregoing description it is thought to be obvious that a tire regrooving device constructed in accordance with my invention is particularly well adapted for use by reason of the convenience and facility with which it may be assembled and operated.

I claim:

1. In a machine for grooving tires and the like, a supporting structure, a groove cutting assembly, said groove cutting assembly including a box, a cutter bar insertible into said box, a groove cutting blade carried by an end of said bar, a pressure lever operatively engaged for swinging movement with the box, said lever upon movement in one direction contacting with the end of the cutter bar remote from the cutting blade to maintain the blade in working contact with the tire, and means for automatically retracting the cutter bar.

2. In a machine for grooving tires and the like, a supporting structure, a groove cutting assembly, said groove cutting assembly including a box, a cutter bar insertible into said box, a groove cutting blade carried by an end of said bar, a pressure lever operatively engaged for swinging movement with the box, said lever upon movement in one direction contacting with the end of the cutter bar remote from the cutting blade to maintain the blade in working contact with the tire, and a resilient member operatively engaged with the box and with the cutter bar for retracting the bar with respect to the box.

3. In a machine for grooving tires and the like, a supporting structure, a groove cutting assembly, said groove cutting assembly including a box, a cutter bar insertible into said box, a groove cutting blade carried by an end of said bar, and a pressure lever operatively engaged for swinging movement with the box, said lever upon movement in one direction contacting with the end of the cutter bar remote from the cutting blade to maintain the blade in working contact with the tire, said cutter bar being freely removable from the box.

PAUL STEPHENS.